US010767569B2

(12) United States Patent
Gassner et al.

(10) Patent No.: US 10,767,569 B2
(45) Date of Patent: Sep. 8, 2020

(54) METHOD FOR CONTROLLING THE OPERATION OF A GAS TURBINE WITH AN AVERAGED TURBINE OUTLET TEMPERATURE

(71) Applicant: ANSALDO ENERGIA SWITZERLAND AG, Baden (CH)

(72) Inventors: Martin Gassner, Bern (CH); Andreas Jan Schesny, Zürich (CH); Sebastian Lipari, Neuenhof (CH); Stefano Bernero, Oberrohrdorf (CH); Manuel Ramirez-Espana-Mejia, Frick (CH); Mengbin Zhang, Otelfingen (CH)

(73) Assignee: Ansaldo Energia Switzerland AG, Baden (CH)

( * ) Notice: Subject to any disclaimer, the term of this patent is extended or adjusted under 35 U.S.C. 154(b) by 754 days.

(21) Appl. No.: 15/351,102

(22) Filed: Nov. 14, 2016

(65) Prior Publication Data

US 2017/0138273 A1 May 18, 2017

(30) Foreign Application Priority Data

Nov. 13, 2015 (EP) .................................. 15194421

(51) Int. Cl.
*F02C 9/28* (2006.01)
*F01D 21/12* (2006.01)
(Continued)

(52) U.S. Cl.
CPC .............. *F02C 9/28* (2013.01); *F01D 17/085* (2013.01); *F01D 21/12* (2013.01); *F02C 3/04* (2013.01);
(Continued)

(58) Field of Classification Search
CPC ...... F01D 17/085; F01D 17/02; F01D 21/003; F01D 21/12; F05D 2270/112;
(Continued)

(56) References Cited

U.S. PATENT DOCUMENTS 4,058,975 A * 11/1977 Gilbert .................. G01K 15/00
374/1
4,583,360 A * 4/1986 Nick ......................... F02C 9/28
60/773

(Continued)

FOREIGN PATENT DOCUMENTS

CN 103850803 A 6/2014
CN 104373219 A 2/2015
(Continued)

OTHER PUBLICATIONS

Extended European Search Report dated May 23, 2016, by the European Patent Office in corresponding European Patent Application No. 15194421.2-1607.
(Continued)

*Primary Examiner* — Jason H Duger
(74) *Attorney, Agent, or Firm* — Buchanan Ingersoll & Rooney PC

(57) ABSTRACT

A method is disclosed for operating a gas turbine having a compressor, a combustor, a turbine downstream of the combustor, and a total number of turbine outlet temperature measurements. The method includes locally measuring the turbine outlet temperature of the turbine with the turbine outlet temperature measurements of the respective turbine, and averaging measured temperatures of the selected turbine outlet temperature measurements to obtain an average turbine outlet temperature. The gas turbine operation is controlled depending on the determined average turbine outlet temperature.

20 Claims, 3 Drawing Sheets

(51) Int. Cl.
*F01D 17/08* (2006.01)
*F02C 3/04* (2006.01)

(52) U.S. Cl.
CPC ...... *F05D 2220/32* (2013.01); *F05D 2250/52* (2013.01); *F05D 2270/303* (2013.01); *F05D 2270/80* (2013.01); *F05D 2270/803* (2013.01)

(58) Field of Classification Search
CPC ......... F05D 2270/303; F05D 2207/087; F05D 2260/80; F05D 2260/83; F02C 9/28; F02C 3/04; G01K 3/02; G01K 3/06; G01K 2003/145; G01K 2003/2013; G01K 2003/024; G01K 2205/04; G01K 1/026; G01J 5/0088; F23N 2025/08

See application file for complete search history.

(56) References Cited

U.S. PATENT DOCUMENTS

| | | | |
|---|---|---|---|
| 5,265,036 A * | 11/1993 | Suarez-Gonzalez | ........................ G01J 5/0022 356/45 |
| 5,617,718 A | 4/1997 | Althaus | |
| 5,634,327 A | 6/1997 | Kamber et al. | |
| 8,843,293 B2 | 9/2014 | Rofka et al. | |
| 9,790,834 B2 * | 10/2017 | Miller | ................... F01N 11/002 |
| 2002/0149485 A1 | 10/2002 | Nagata et al. | |
| 2004/0182067 A1 | 9/2004 | Nagata et al. | |
| 2009/0150040 A1 | 6/2009 | Rofka et al. | |
| 2012/0150413 A1 * | 6/2012 | Bunce | ...................... F02C 9/28 701/100 |
| 2015/0040573 A1 | 2/2015 | Ferreira-Providakis et al. | |

FOREIGN PATENT DOCUMENTS

| | | |
|---|---|---|
| CN | 104712434 A | 6/2015 |
| EP | 0 718 470 A2 | 6/1996 |
| EP | 1 251 258 A2 | 10/2002 |
| EP | 2 071 157 A1 | 6/2009 |
| EP | 2 469 041 A1 | 6/2012 |

OTHER PUBLICATIONS

Office Action for Chinese Application No. 201611272982.5 dated Feb. 21, 2020.
Office Action for Chinese Application No. 201611272982.5 dated Feb. 21, 2020 (English Translation).

* cited by examiner

METHOD FOR CONTROLLING THE OPERATION OF A GAS TURBINE WITH AN AVERAGED TURBINE OUTLET TEMPERATURE

TECHNICAL FIELD

The invention refers to a method for averaging the turbine outlet temperature of a gas turbine and operating a gas turbine using that turbine outlet temperature. The invention additionally refers to a gas turbine with a controller which is configured and adapted to carry out such a method.

BACKGROUND OF THE DISCLOSURE

The turbine outlet temperature is one parameter which can be used to control the operation of a gas turbine and for protection of a gas turbine during operation. An example for the control of a gas turbine using the turbine outlet temperatures has been disclosed for example in the EP2071157 A1.

The turbine outlet temperature can also be used for gas turbines with sequential combustion. The control of gas turbines with sequential combustion has been the object of various documents in the past. A basic operating concept for a gas turbine with sequential combustion is for example described in the EP0718470 A2.

A reliable and precise measurement of the turbine outlet temperature is a precondition for a reliable and precise control of the gas turbine operation over the whole load range.

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures. In addition fuel from different sources with different fuel gas composition is used depending on price and availability.

At the same time, emission limit values and overall emission permits are becoming more stringent, so that it is required to operate at lower emission values, keep low emissions also at part load operation, during transients, as these also count for cumulative emission limits, and for different fuel compositions. To assure low emissions and stable operation an accurate and robust determination of the turbine outlet temperature is required.

Typically the arithmetic average of all turbine outlet temperature measurements is determined in a gas turbine controller and used for controlling the gas turbine operation. Theoretically, averaging of all individual temperature measurements is the best way to obtain a turbine exit temperature However, leakages and imperfections in the gas turbine can influence the measurement. In particular cooling air leakages close to turbine outlet temperature measurement sensors can influence the locally measured turbine outlet temperature.

These leakages are typically small for a new and clean engine (or an engine reassembled after an outage) and an engine is adjusted to take into account such leakages after an outage. However, leakages and other factors impairing the temperature measurement can increase or change during operation.

These leakages affect some of the single turbine outlet temperature measurements, which are averaged to give an average turbine outlet temperature TAT AVG, because the respective temperature sensors are influenced by cold leakage flow causing a measurement error, i.e. signaling a lower temperature.

The controller then adjusts the operation to compensate for these changes in the averaged turbine outlet temperature. For example the controller can increase the fuel flow to keep the measured turbine outlet temperature (respectively the turbine inlet temperature TIT of the turbine) at the target temperature. Because of the measurement error can increase over time, actual turbine inlet temperature values increase leading to higher NOx emissions (and increased life time consumption of the machine).

For gas turbines with sequential combustion the first turbine outlet temperature measurement and the second turbine outlet temperature measurement can be influenced by leakages.

SUMMARY OF THE DISCLOSURE

One object of the present disclosure is a method for operating a gas turbine which remains stable and reliable even when local turbine outlet temperature measurements are impaired. The gas turbine comprises a compressor, a combustor, a turbine downstream of the combustor, and a total number of turbine outlet temperature measurements.

The disclosed method for operating a gas turbine comprises the steps of:
 measuring the turbine outlet temperature of the turbine with turbine outlet temperature measurements of the respective turbine,
 selecting a number of turbine outlet temperature measurements which is smaller than the total number of the turbine outlet temperature measurements,
 averaging the measured temperatures of the selected turbine outlet temperature measurements to obtain an average turbine outlet temperature, and
 controlling the operation of the gas turbine in dependence of the average turbine outlet temperature.

The turbine outlet temperature measurements, e.g. thermocouples or other sensors to which indicate the temperature, can for example be distributed to cover the whole flow area of the turbine outlet, in particular that each temperature measurement is in the center an assigned section of the flow area or flow duct wherein each section has the same area. For an exhaust duct with inhomogeneous temperature or velocity profiles it can be advantegeous to distribute the temperature measurements such that they are representative for sections with equal exhaust mass flow through each assigned section.

A combustor can comprise a plurality of burners upstream of an annular combustion chamber or can comprise a plurality of burners upstream of a plurality of can combustion chambers. According to an embodiment of the method all burners of the combustor upstream of the respective turbine are in operation.

The method can be applied to a gas turbine with sequential combustion or to a gas turbine with a single combustor and one turbine. A sequential combustion gas turbine has a first combustor, a first turbine, a second combustor, and a second turbine. In sequential combustion gas turbines, the first turbine outlet temperature can be measured and the second turbine outlet temperature can be measured using respective first and second turbine outlet temperature measurements.

According to the first embodiment all of the combustors upstream of the first turbine, respectively upstream of the second turbine are in operation.

According to another embodiment of the method the turbine outlet temperature measurements with good data quality are identified. Only turbine outlet temperature measurements with good data quality are selected for averaging the turbine outlet temperature. In this embodiment the average turbine outlet temperature is averaged based on a number of selected turbine outlet measurement values with good data quality which is smaller than the total number of available turbine outlet temperature measurements with good data quality.

Good data quality can be determined for example by confirming that no bad data quality signal is send from the measurement chain starting at the temperature sensor and leading via transducers and data lines to the controller. Good data quality can also be determined by comparing the measured temperature value with the average of all measured temperatures, or with an expected value which can for example depend on the operating conditions of the gas turbine. The relative load or inlet guide vane position, time since start up could be indicative of the operating condition. The corresponding expected turbine outlet temperature can for example be provided in a look up table.

In a further embodiment of the method a proper subset of the turbine outlet temperature measurements is selected for obtaining the average turbine outlet temperature. The selected proper subset of turbine outlet temperature measurements comprises the turbine outlet temperature measurements with a specified number of the highest measurement values.

In yet another embodiment of the method the selected proper subset consists of the i highest to the j highest turbine outlet temperature measurements wherein i, and j are natural numbers. Further, i is 2 or larger than 2, j is equal or larger to i, and i and j are smaller than the total number of outlet temperature measurements.

Typically a gas turbine controller has a clock defining controller cycles and updates data and commands at each cycle. The cycles are defined by the clock. According to another embodiment of the method only turbine outlet temperature measurements with a measured value which is within a limited temperature deviation from the average turbine outlet temperature (TAT AVG) of the preceding controller cycle are selected for averaging the turbine outlet temperature. The limited temperature deviation can for example be a deviation of 80° C., preferably it is a smaller deviation and be limited to a deviation of 50° C., and it can be as small as for example 20° C. or less.

The method steps of averaging and identifying the order of size of variables requires noticeable processing power. To limit the required processing power of the controller a method which avoids the step of averaging in one controller cycle is proposed. This Embodiment takes advantage of the fact that a temperature measurement is slow relative to the cycle time of the controller. Because the temperature measurement is slow the temperature values from different time steps can be used to calculate and approximate the average temperature over several controller cycles. The averaging is carried out over a number of controller cycles and comprises the following steps:

a) Set an average turbine outlet temperature variable to zero, assign the turbine outlet temperatures measurements selected to obtain the average turbine outlet temperature to a summing list, and in each subsequent cycle b) determine the maximum local turbine outlet temperature of the turbine outlet temperature measurements, which are on the summing list, c) add the measurement value of the determined maximum local turbine outlet temperatures to the average first-turbine outlet temperature variable, d) remove the determined maximum local turbine outlet temperature measurement from the summing list, e) repeat the steps b) to d) for a specific number of times, or until the summing list is empty.

f) divide the average first-turbine outlet temperature variable by the number of measurements added to this variable to obtain the average turbine outlet temperature.

Before a complete failure a temperature measurement might drift to very high temperatures before the measurement chain can recognize that such a temperature measurement has bad data quality. According to one embodiment the highest or the m highest turbine outlet temperature measurements are not used for averaging the turbine outlet temperature. Typically it is sufficient to simply neglect the single highest temperature measurement because it is very unlikely that more than one temperature measurement has a significant drift which is not recognized as a measurement error. However two or more of the highest temperature measurement values can be neglected or skipped. Two or more than two measurements might be omitted if a very large number of turbine outlet temperature measurements is used, e.g. if a total of more than 20 measurements is used which increases the probability of drifts occurring simultaneously.

In the method suggested above for averaging the turbine outlet temperature over a number of cycles the step c) can be replaced by the following steps c1) and c2) to avoid the use of them highest turbine outlet temperature measurements:

c1) continuing with step d) if it is one of the first to m-th time that a maximum turbine outlet temperature measurement (18, 19) has been detected in the number of controller cycles for averaging, wherein m is a natural number smaller than the number of turbine outlet temperatures measurements (18, 19) on the summing list, c2) adding the measurement value of the determined maximum turbine outlet temperature (18, 19) to the average turbine outlet temperature variable.

According to a further embodiment of the method the average turbine outlet temperature is controlled to a set point temperature or the average turbine outlet temperature used to control the combustor temperature to a set point temperature. The control is carried out with a closed loop control using the fuel flow to the combustor as correcting variable, i.e. the fuel flow is increases if the average turbine outlet temperature is below the set point temperature, and the fuel flow is reduced if the average turbine outlet temperature is above the set point temperature. The average turbine outlet temperature can for example be used to control the combustor temperature to a set point temperature with the help of a so called turbine inlet temperature formula where the turbine inlet temperature or combustor exit temperature is approximated based on the turbine outlet temperature and other operating parameters of the gas turbine such as for example the combustor pressure or the compressor inlet temperature.

According to yet another embodiment of the method all available turbine outlet temperature measurements are used for calculating the average turbine outlet temperature for operation of the gas turbine below a relative load limit. For operation of the gas turbine above the relative load limit the selected turbine outlet temperatures measurements are used for calculating the average turbine outlet temperature.

Relative load can for example be defined as the actual power divided by the base load power which can be produced by the gas turbine at the respective ambient conditions. The relative load limit up to which all available turbine outlet temperature measurements are used for calculating the average turbine outlet temperature can for example be the minimum load, i.e. the minimum load at which the generator is connected to the grid to deliver power to the grid, or the relative load limit can be 10% or a value in a range up 50% relative load.

A comparison of the average turbine outlet temperature of all turbine outlet temperature measurements with the average turbine outlet temperature obtained with the selected turbine outlet temperature measurements can indicate large leakages or inconsistencies of temperature measurements. These could be due a damage or failure of a gas turbine component.

Accordingly, in a further embodiment of the method the measurement values of all available turbine outlet temperatures measurements are averaged to obtain a reference average turbine outlet temperature. The difference between the reference average turbine outlet temperature and the average turbine outlet temperature based on the selected turbine outlet temperatures is calculated. A protective action of the gas turbine is triggered if the difference exceeds an allowable deviation. The allowable deviation can be for example a temperature difference in the range of 5° C. to 80° C.; preferably it is in a smaller range in the order of 10° C. to 50°. In some embodiments the allowable deviation is below 20° C.

The protective action can for example be a deloading of the gas turbine, i.e. a load reduction with a normal load gradient or an increased load gradient until the difference falls below the allowable deviation or down to idle. The protective action can for example also be a load shedding, i.e. an immediate load rejection and followed by operation at ide. This idle operation can be followed by a trip or the gas turbine can be directly tripped.

The method can be applied to gas turbines with a single combustor followed by a turbine. It can also be applied to the gas turbine which is configured as a sequential combustion gas turbine having a first combustor, a first turbine downstream of the first combustor, a second combustor downstream of said first turbine, and a second turbine downstream of said second combustor.

A sequential combustion gas turbine can have a total number of first turbine outlet temperature measurements downstream of the first turbine.

According to an embodiment of the method for operating a sequential combustor gas turbine selected first turbine outlet temperature measurements are averaged to obtain an average first turbine outlet temperature (TAT1 AVG).

A sequential combustion gas turbine can have a total number of second turbine outlet temperature measurements. According to an embodiment of the method for operating a sequential combustor gas turbine selected second turbine outlet temperature measurements are averaged to obtain an average second turbine outlet temperature (TAT2 AVG).

Besides the method a gas turbine comprising a compressor, a combustor, a turbine downstream of the combustor, a total number of turbine outlet temperature measurements, and a controller which is configured to carry out the method is part of the disclosure.

The gas turbine can be a gas turbine with a single combustor followed by one turbine. The gas turbine can also be a sequential combustion gas turbine having a first combustor, a first turbine downstream of the first combustor, a second combustor downstream of said first turbine, and a second turbine downstream of said second combustor.

BRIEF DESCRIPTION OF THE DRAWINGS

The disclosure, its nature as well as its advantages, shall be described in more detail below with the aid of the accompanying schematic drawings.

Referring to the drawings.

EMBODIMENTS OF THE DISCLOSURE

Figure 1:
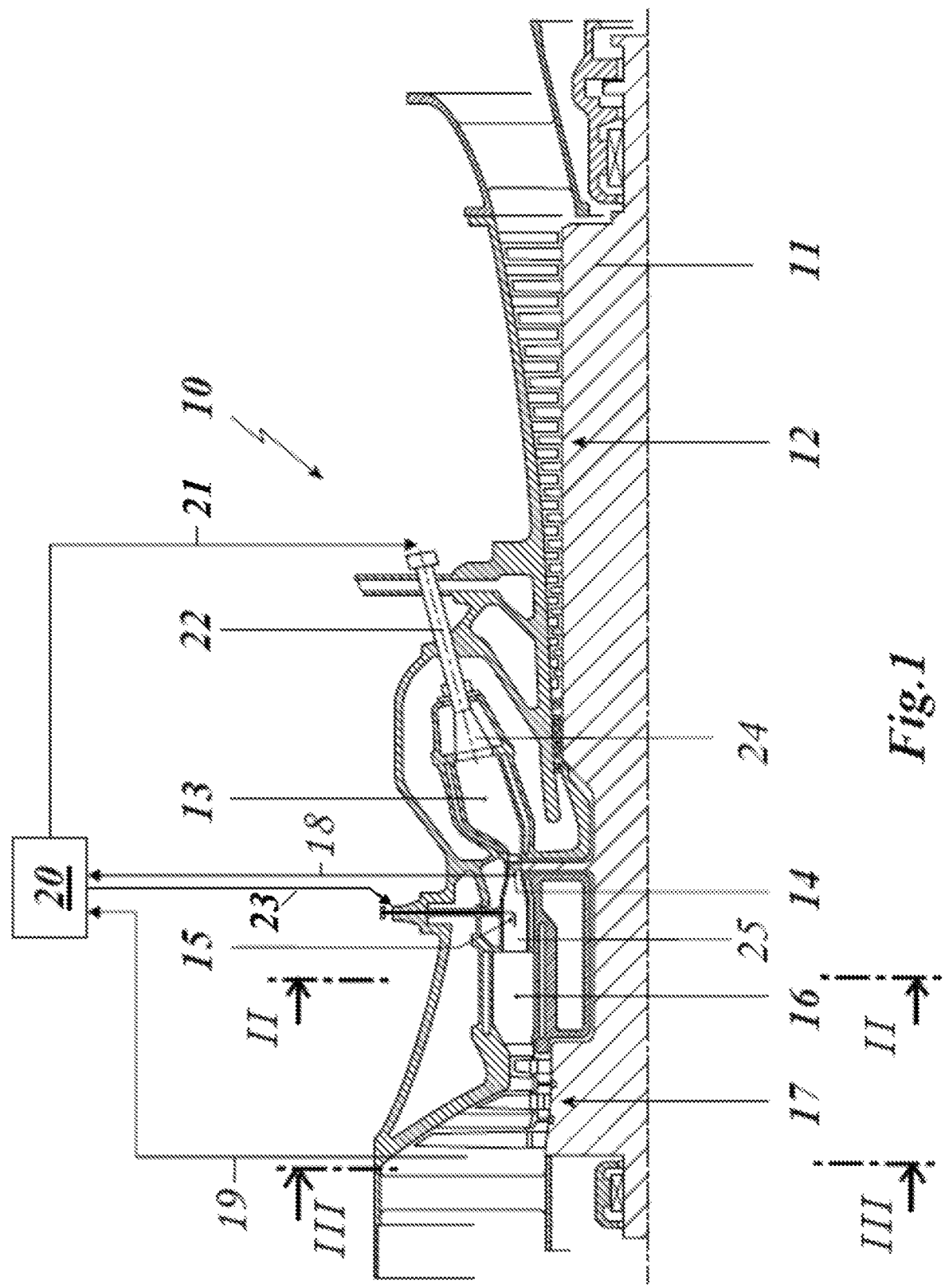
FIG. 1 shows a gas turbine with sequential combustion and a closed loop control circuit for its operation.

A control scheme of a gas turbine with sequential combustion (known for example for GT24 or GT26) is shown in FIG. 1. The gas turbine 10 comprises a rotor 11, which is surrounded by a concentric casing. A compressor 12 compresses air that enters a first combustor 13 with a first burner 24 through a plenum. Fuel is supplied via a first burner fuel supply 22. The resulting hot gas leaving the first combustor 13 drives a first turbine 14 also called high-pressure turbine. Downstream of first turbine 14 fuel is injected into the gas, which still contains sufficient oxygen for further combustion via a second burner fuel lance 15. The fuel burns in the second combustor 16. The re-heated gas drives a second turbine 17 which is also called low-pressure turbine, and finally exits the gas turbine 10. The first turbine outlet temperature measurement 18 can also be integrated or attached to the second burner fuel lance 15.

A controller 20, which controls the operation of gas turbine 10, receives measurement values from first turbine outlet temperature measurements 18 being measured at various (e.g. 24) points at the outlet of the first turbine 14. Furthermore, it receives measurement values of second turbine outlet temperature measurements 19 of the second turbine 17 being measured at various points at the outlet of the second turbine 17. Using the measured data the controller 20 controls the operation of the first combustor 13 by means of a first burner fuel control line 21 and the operation of the second combustor 16 by means of a second burner fuel control line 23.

The gas turbine system can be coupled to a generator via the rotor 11. Typically, a gas turbine 10 further comprises a cooling system for the first turbine 14 and second turbine 17 and sequential combustor arrangement, which is not shown as they are not the subject of this disclosure.

Exhaust gases leave the second turbine 17. The remaining heat of the exhaust gases is typically used in a subsequent water steam cycle, which is also not shown here.

Figure 2:
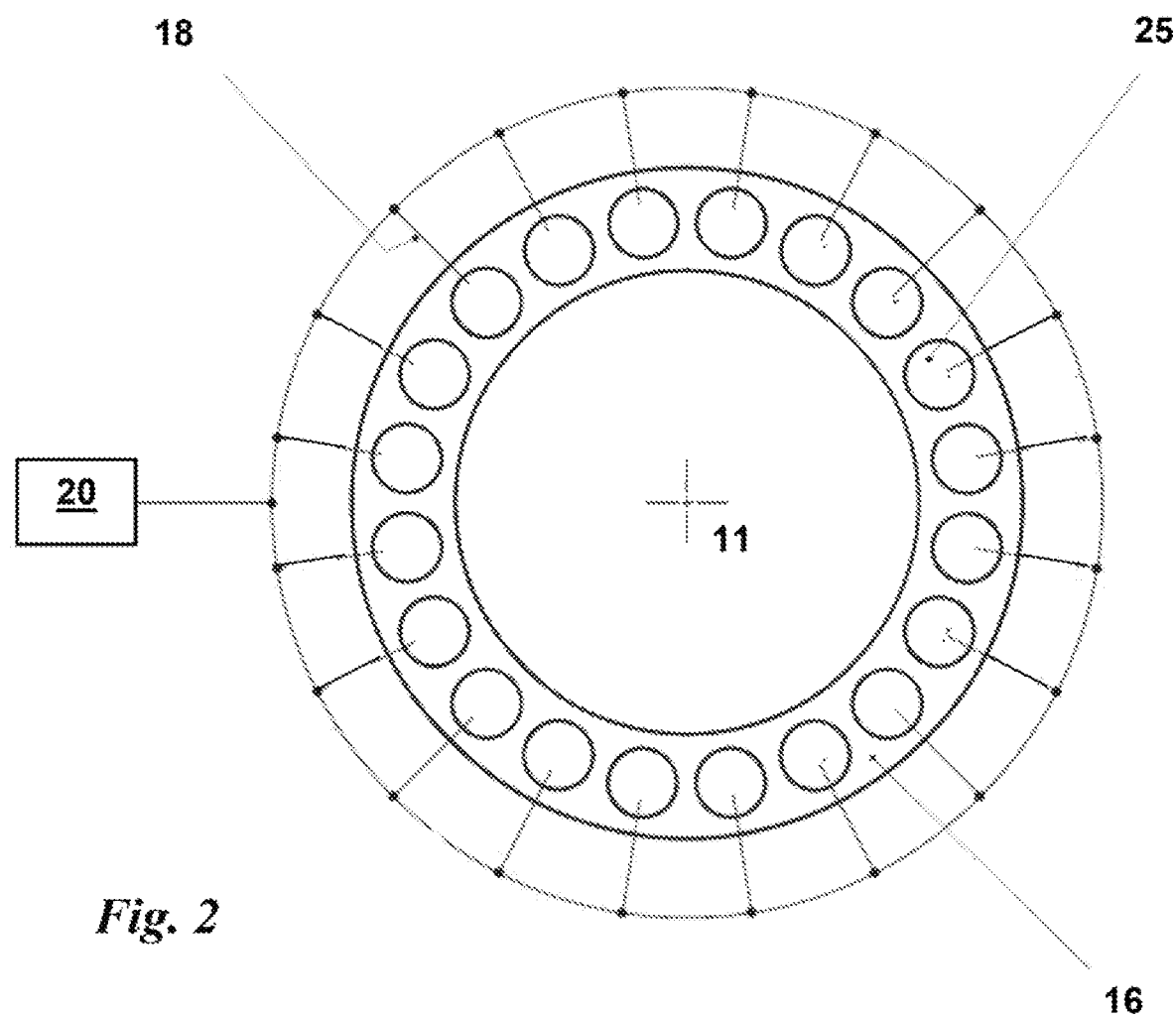
FIG. 2 shows the cross section II-II of the combustor with first turbine outlet temperature measurements.

An example of an arrangement of the first turbine outlet temperature measurements 18 is shown in FIG. 2. FIG. 2 shows the cross section II-II of FIG. 1 through the annular second combustor 16 with a plurality of second burners 25 upstream of the second combustor 16. In each second burner 25 a first turbine outlet temperature measurement 18 is arranged which is connected to the controller 20.

Figure 3:
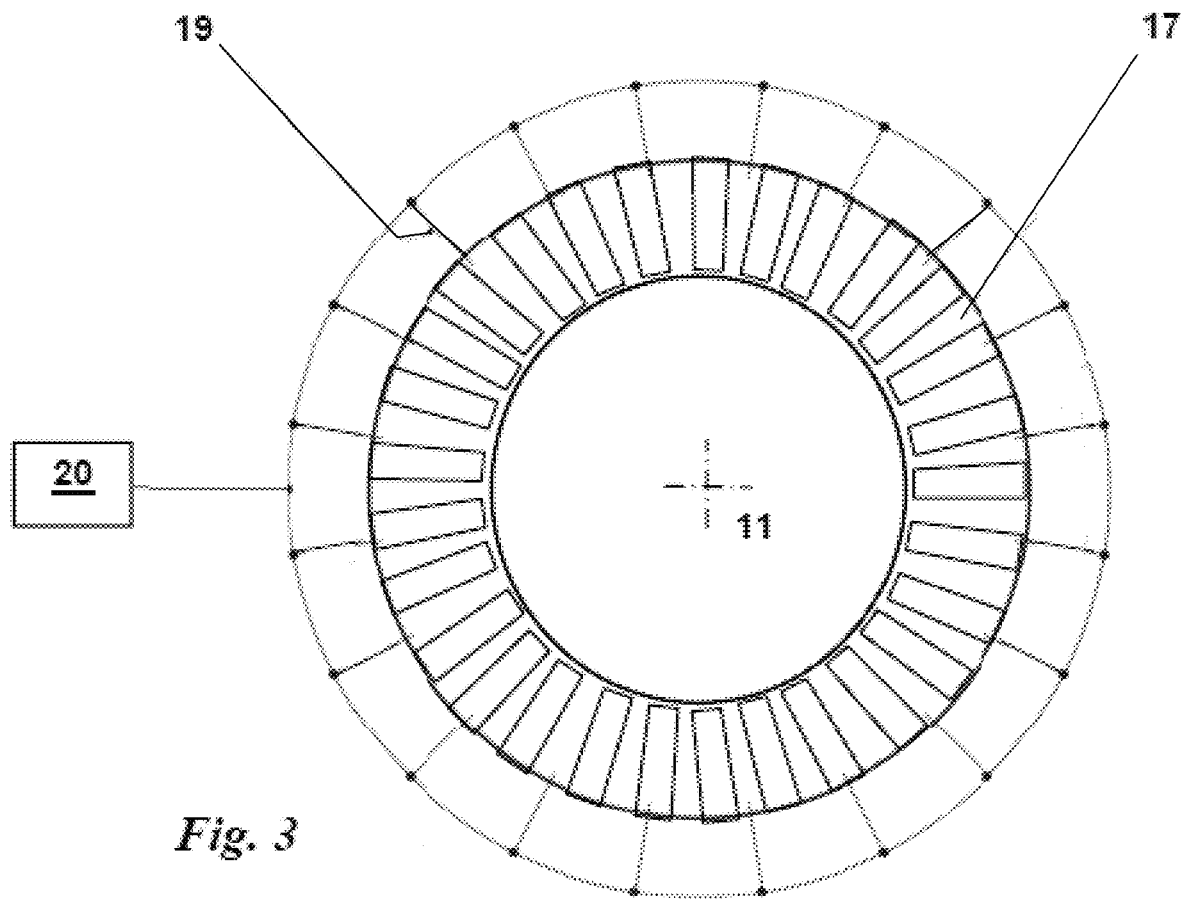
FIG. 3 shows the cross section III-III of the second turbine outlet with second turbine outlet temperature measurements.

An example of an arrangement of the second turbine outlet temperature measurements 19 is shown in FIG. 3. FIG. 3 shows the cross section III-III of FIG. 1 with the outlet of the second turbine 17. A number of second turbine outlet temperature measurement 19 is arranged downstream of the second turbine which is connected to the controller 20. The number of second turbine 17 outlet temperature measurements can for example correspond to the number of second burners 25.

Figure 4:
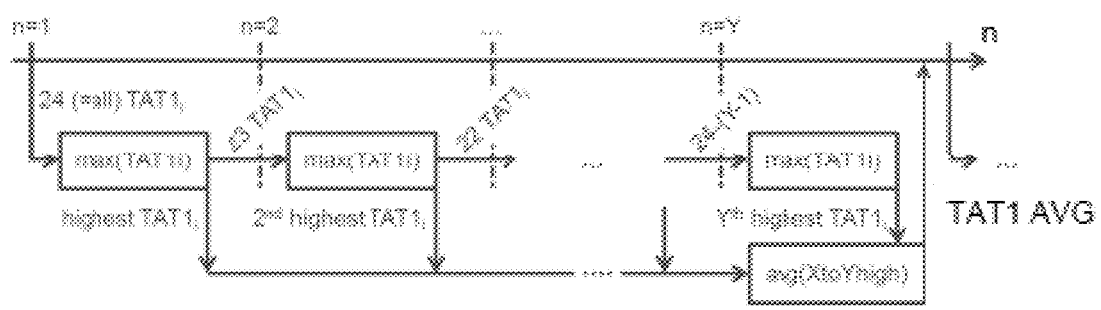
FIG. 4 shows a calculation routine for determining the average turbine outlet temperature over a number of y controller cycles.

A calculation routine for determining the average turbine outlet temperature of a first turbine TAT1 AVG in a controller 20 over a number of y controller cycles is shown in FIG. 4. At a first cycle n=1 the maximum turbine outlet temperature measurement max(TAT1$i$) is determined and stored in an averaging variable also called average turbine outlet temperature variable. For each subsequent controller cycle n until n reaches a number of turbine outlet temperature measurements used for temperature averaging y, the maximum turbine outlet temperature measurement max(TAT1$i$) among the remaining first turbine outlet temperature measurements 19 is determined and added to the averaging variable. When the controller cycle n=y is reached the value of the average turbine outlet temperature variable is divided by n=y to obtain the average turbine outlet temperature of the first combustor TAT1 AVG. The average turbine outlet temperature of a second turbine can be determined analogously.

All the explained advantages are not limited to the specified combinations but can also be used in other combinations or alone without departing from the scope of the disclosure. Other possibilities are optionally conceivable, for example the second combustor can have can combustors.

LIST OF DESIGNATIONS 10 gas turbine
11 rotor
12 compressor
13 first combustor
14 first turbine
15 second burner fuel lance
16 second combustor
17 second turbine
18 first turbine outlet temperature measurement
19 second turbine outlet temperature measurement
20 controller
21 first burner fuel control line
22 first burner fuel supply
23 second burner fuel control line
24 first burner
25 second burner
n controller tact
y number of turbine outlet temperature measurements used for temperature averaging
TAT AVG average turbine outlet temperature
TAT1 AVG average first turbine outlet temperature
TAT2 AVG average second turbine outlet temperature max (TAT1$i$)

The invention claimed is:

1. A method for operating a gas turbine having a compressor, a combustor, a turbine downstream of the combustor, and sensors distributed at a total number of measurement points about the turbine, the method comprising:
   determining with the sensors a turbine outlet temperature measurement at each of the total number of measurement points to yield a total number of turbine outlet temperature measurements;
   obtaining a reference average turbine outlet temperature based on all the turbine outlet temperature measurements determined at each of the total number of measurement points;
   selecting a number of the turbine outlet temperature measurements, which is smaller than the total number of the turbine outlet temperature measurements, as selected turbine outlet temperature measurements, wherein the selecting is performed by determining ones of the turbine outlet temperature measurements which satisfy a selection criteria;
   averaging the selected turbine outlet temperature measurements to obtain a value of an average turbine outlet temperature;
   controlling an operation of the gas turbine in dependence of a deviation calculated between the reference average turbine outlet temperature obtained and the value of the average turbine outlet temperature; and
   wherein the selection criteria includes one of:
      having a specified data quality,
      having a measurement value within a specified number of highest measurement values considering all the turbine outlet temperature measurements determined at each of the total number of measurement points, and
      having a measurement value within a specified temperature deviation from a previously obtained value of the average turbine outlet temperature.

2. The method as claimed in claim 1, wherein burners of the combustor upstream of the turbine are in operation when the method is performed.

3. The method as claimed in claim 1, wherein the selection criteria is the having the specified data quality.

4. The method as claimed in claim 1, wherein the selection criteria is the having the measurement value within the specified number of highest measurement values considering all the turbine outlet temperature measurements determined at each of the total number of measurement points.

5. The method as claimed in claim 1, wherein the selection criteria is the having the measurement value within the specified temperature deviation from the previously obtained value of the average turbine outlet temperature.

6. The method as claimed in claim 1, wherein a controller of the gas turbine has a clock defining controller cycles, wherein the selection criteria is the having the measurement value within the specified temperature deviation from the previously obtained value of the average turbine outlet temperature, and wherein the previously obtained value of the average turbine outlet temperature is determined at a preceding one of the controller cycles.

7. The method as claimed in claim 1, wherein the averaging is carried out over a number of cycles of a controller of the gas turbine engine, the averaging comprising:
   assigning a number of the selected turbine outlet temperature measurements to a summing list; and
   dividing a sum of the selected turbine outlet temperature measurements assigned to the summing list by the number of the selected turbine outlet temperature measurements assigned to the summing list to obtain the value of the average turbine outlet temperature.

8. The method as claimed in claim 1, wherein the averaging is carried out over a number of cycles of a controller of the gas turbine engine, the averaging comprising:
   assigning the selected turbine outlet temperature measurements to a summing list;
   determining ones of the selected turbine outlet temperature measurements assigned to the summing list that are within a specified number of highest measurement values on the summing list;

determining a sum of the ones of the selected turbine outlet temperature measurements assigned to the summing list that are within the specified number of the highest measurement values on the summing list; and dividing the sum by the specified number to obtain the value of the average turbine outlet temperature.

9. The method as claimed in claim 1, wherein the average turbine outlet temperature is controlled to a set point temperature or the average turbine outlet temperature is used to control a temperature of the combustor to a set point temperature with a closed loop control using fuel flow to the combustor as a correcting variable.

10. The method as claimed in claim 1, wherein the gas turbine operates above a relative load limit.

11. The method as claimed in claim 1, wherein controlling the operation of the gas turbine comprising: triggering a protective action upon the deviation calculated between the reference average turbine outlet temperature obtained and the value of the average turbine outlet temperature exceeding an allowable deviation.

12. The method as claimed in claim 11, wherein the protective action is one of a deloading, a load shedding, and a trip of the gas turbine.

13. The method as claimed in claim 1, wherein the gas turbine is configured as a sequential combustion gas turbine, wherein the combustor is a first combustor and the turbine is a first turbine downstream of the first combustor, and the gas turbine also has a second combustor downstream of said first turbine, and a second turbine downstream of said second combustor.

14. The method as claimed in claim 1, wherein the turbine is a second turbine and the combustor is a second combustor, wherein the gas turbine is configured as a sequential combustion gas turbine having a first combustor, a first turbine downstream of the first combustor, the second combustor downstream of said first turbine, and the second turbine downstream of said second combustor.

15. The method of claim 1, wherein the selection criteria is the having the specified data quality and the specified data quality is based on one of a relative load and an inlet guide vane position.

16. The method of claim 1, wherein the selection criteria is the having the specified data quality and the specified data quality is based on time since a start up of the gas turbine.

17. A gas turbine comprising:
a compressor;
a combustor;
a turbine downstream of the combustor,
sensors distributed at a total number of measurement points about the turbine; and
a controller, wherein the controller is configured to carry out a method which includes:
determining with the sensors a turbine outlet temperature measurement at each of the total number of measurement points to yield a total number of turbine outlet temperature measurements;
obtaining a reference average turbine outlet temperature based on all the turbine outlet temperature measurements determined at each of the total number of measurement points;
selecting a number of the turbine outlet temperature measurements, which is smaller than the total number of the turbine outlet temperature measurements, as selected turbine outlet temperature measurements, wherein the selecting is performed by determining ones of the turbine outlet temperature measurements which satisfy a selection criteria;
averaging the selected turbine outlet temperature measurements to obtain a value of an average turbine outlet temperature;
controlling an operation of the gas turbine in dependence of a deviation calculated between the reference average turbine outlet temperature obtained and the value of the average turbine outlet temperature; and
wherein the selection criteria includes one of:
having a specified data quality,
having a measurement value within a specified number of highest measurement values considering all the turbine outlet temperature measurements determined at each of the total number of measurement points, and
having a measurement value within a specified temperature deviation from a previously obtained value of the average turbine outlet temperature.

18. The gas turbine of claim 17, wherein the combustor is a first combustor and the turbine is a first turbine and wherein the gas turbine also comprises:
a second combustor downstream of the first turbine and a second turbine downstream of the second combustor.

19. The gas turbine of claim 17, wherein the combustor is a second combustor and the turbine is a second turbine and wherein the gas turbine also comprises:
a first combustor upstream of a first turbine, the second combustor being downstream of the first turbine.

20. The gas turbine of claim 17, wherein the sensors include thermocouples.

* * * * *